United States Patent
Koyama

(10) Patent No.: US 11,138,988 B2
(45) Date of Patent: Oct. 5, 2021

(54) PLAYING METHOD FOR PLAYING MULTI-LANGUAGE CONTENTS FOR EDUCATION, AND DATA STRUCTURE AND PROGRAM THEREFOR

(71) Applicant: Osamu Koyama, Osaka (JP)

(72) Inventor: Osamu Koyama, Osaka (JP)

( * ) Notice: Subject to any disclaimer, the term of this patent is extended or adjusted under 35 U.S.C. 154(b) by 0 days.

(21) Appl. No.: 16/808,630

(22) Filed: Mar. 4, 2020

(65) Prior Publication Data

US 2020/0286502 A1   Sep. 10, 2020

(30) Foreign Application Priority Data

Mar. 7, 2019   (JP) .............................. JP2019-041693

(51) Int. Cl.
| | |
|---|---|
| *G10L 21/10* | (2013.01) |
| *G10L 21/055* | (2013.01) |
| *G09B 5/06* | (2006.01) |
| *G09B 19/06* | (2006.01) |
| *G11B 27/10* | (2006.01) |

(52) U.S. Cl.
CPC .............. *G10L 21/10* (2013.01); *G09B 5/065* (2013.01); *G09B 19/06* (2013.01); *G10L 21/055* (2013.01); *G11B 27/10* (2013.01)

(58) Field of Classification Search
CPC ......... G10L 21/10; G09B 5/065; G09B 19/06; G11B 27/10
See application file for complete search history.

(56) References Cited

U.S. PATENT DOCUMENTS

| | | | |
|---|---|---|---|
| 2004/0152055 A1 | 8/2004 | Gliessner et al. | |
| 2006/0224940 A1* | 10/2006 | Lee ........................ | G11B 27/34 |
| | | | 715/203 |
| 2009/0175596 A1 | 7/2009 | Hirai | |
| 2016/0133154 A1* | 5/2016 | Cortes .................... | G09B 5/065 |
| | | | 434/157 |

FOREIGN PATENT DOCUMENTS

| | | | |
|---|---|---|---|
| EP | 1 562 163 | 8/2005 | |
| EP | 3136394 A1 * | 3/2017 | ............ G11B 27/36 |
| JP | 11-65423 | 3/1999 | |
| JP | 2006-518872 | 8/2006 | |
| JP | 2009-164979 | 7/2009 | |
| JP | 2013-258637 | 12/2013 | |

\* cited by examiner

*Primary Examiner* — Girumsew Wendmagegn
(74) *Attorney, Agent, or Firm* — Wenderoth, Lind & Ponack, L.L.P.

(57) ABSTRACT

Video contents having language information including spoken voices in a plurality of languages can be efficiently played to support language learning. After removing line-free parts from the video contents, the video contents are divided into divided scenes each corresponding to one or two consecutive displays of subtitles. Each of selected scenes of the divided scenes selected by a user is played (i) a first predetermined number of times selected by the user, in one of first and second languages selected beforehand by the user, together with images; and (ii) then a second predetermined number of times selected by the user, in the other of the first and second languages, together with the images.

17 Claims, 12 Drawing Sheets

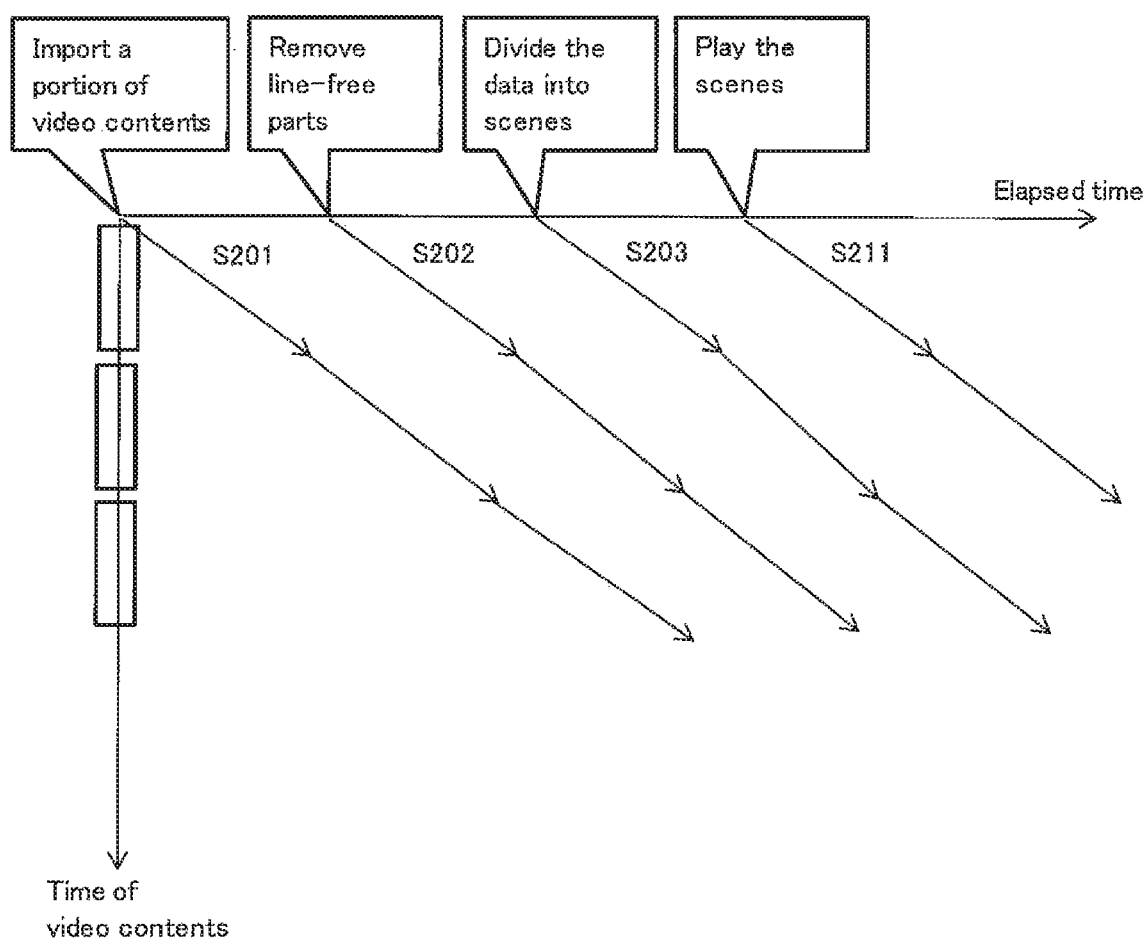

Fig.6A

Sequentially extract, from video contents, the image data of only line parts corresponding to one scene or two scenes; allot scene numbers to the respective image data sets; and temporarily store the image data in a memory.
(Example)
· Image data: V00001

↓ (Next data)

· Image data: V00002

↓ (Next data)

Fig.6B

Link line voices and subtitles corresponding to the play times of the respective extracted image data sets, to the corresponding allotted scene numbers; and sequentially temporarily store them in a memory, with the line voices and subtitles in each language separately from those in other languages.
(Example)
· Japanese voice data: A00001J
· English voice data: A00001E
· Japanese subtitle data: S00001J
· English subtitle data: S00001E ↓ (Next data)

· Japanese voice data: A00002J
· English voice data: A00002E
· Japanese subtitle data: S00002J
· English subtitle data: S00002E ↓ (Next data)

Fig.6C

Export, per scene number, line voice and subtitle data from the memory, and combine these data with the corresponding image data.
(Example)
(1-1) Prepare Japanese data corresponding to scene 00001 by combining together
Image data V00001;
Japanese voice data A00001J; and
Japanese subtitle data S00001J (1-2) Prepare English data corresponding to scene 00001 by combining together
Image data V00001;
English voice data A00001E; and
English subtitle data S00001E ↓ (Next data)

(2-1) Prepare Japanese data corresponding to scene 00002 by combining together
Image data V00002;
Japanese voice data A00002J; and
Japanese subtitle data S00002J (2-2) Prepare English data corresponding to scene 00002 by combining together
Image data V00002;
English voice data A00002E; and
English subtitle data S00002E ↓ (Next data)

Fig.6D

Sequentially play the thus-combined scene data
(1-1) Play scene 00001 in Japanese ↓ (Next data)

(1-2) Play scene 00001 in English

↓ (Next data)

(2-1) Play scene 00002 in Japanese

↓ (Next data)

(2-2) Play scene 00002 in English

↓ (Next data)

Fig. 10

Playing condition setting

Played order: 1st (native) → 2nd | 2nd → Native | Native | 2nd | 3rd

Play the whole video contents in one language:
- Play video contents excluding line-free parts
- Play video contents including line-free parts, too

Played range:
- Play all sentences
- Play a selected sentence

Play frequency:
- Japanese — X times per sentence
- English — Y1 times per sentence
- Chinese — Y2 times per sentence
- Japanese + English + Chinese — Z times per set
- All scenes — A times per whole video content

Time interval between phrases: T seconds

Played speed:
- Japanese — Slow ——●—— Fast
- English — Slow —●—— Fast
- Chinese — Slow —●—— Fast

PLAYING METHOD FOR PLAYING MULTI-LANGUAGE CONTENTS FOR EDUCATION, AND DATA STRUCTURE AND PROGRAM THEREFOR

CROSS REFERENCE TO RELATED APPLICATION(S)

This application is based on and claims priority under 35 U.S.C. sctn. 119 with respect to Japanese Patent Application No. 2019-41693 filed on Mar. 7, 2019, the entire content of which is incorporated herein by reference.

BACKGROUND OF THE INVENTION

The present invention relates to playing contents for language learning.

For language learning, video contents are commonly watched with spoken voices and/or subtitles in a language other than a native language. Specifically, there are two ways for language learning: watching many sets of video contents; and repeatedly watching one set of video contents. The latter way is commonly used for memorizing (spoken) lines verbatim. However, if a learner listens to only spoken voices in a non-native language, he may not be able to understand what the spoken voices mean in his native language. On the other hand, it is also common to listen to spoken voices in a non-native language while watching subtitles in a native language. However, subtitles tend to be partially omitted so as to be displayed within a limited space, or tend to fail to completely coincide in meaning with, or markedly differ in meaning from, the corresponding spoken voices. Therefore, various methods for playing video contents in an efficient manner for language learning have been considered.

Japanese Unexamined Patent Application Publication No. 2013-258637 (JP '637), discloses a method in which a DVD-Video storage medium storing, together with video contents, spoken voices and subtitles in a plurality of languages is used, and language patterns are recorded such that, after a range of the video contents to be played is designated to include two or more consecutive chapters, for example, within the designated range, the video contents are first played in a non-native language, and then repeatedly played in Japanese. According to this method, instead of first watching the whole story of the video contents in a language, and then confirming the video contents in a different language, it is possible to repeatedly play the video contents within a designated range as describe above, thereby enabling concentrated memorization.

Japanese Unexamined Patent Application Publication No. H11-65423 (JP '423) discloses a method in which, when a tape recording a bilingual broadcast is played, spoken voices are first played in a language, and then repeatedly played in a different language per predetermined time interval between lines.

Japanese Unexamined Patent Application Publication No. 2009-164979 (JP '979) discloses a method in which, with a normal playing mode switched to a language learning mode, subtitles are selected.

Japanese Unexamined Patent Application Publication No. 2006-518872 (JP '872) discloses a method in which the played speed of video contents is changed to adjust time intervals between conversations of the video contents (see, e.g., claims 55 to 59).

The method of JP '637 is to repeatedly play a predetermined part of video contents, and is suitable for memorizing a particular part of video contents. However, this method is not suitable for confirming many lines consecutively. The method of JP '423 is ideal in that spoken voices are first played from a tape in a language, and then repeatedly played from a memory in a different language. However, this method can be realized only in a tape including only spoken voices, and thus the use thereof is limited.

The method of JP '979 is excellent as an interface. This method can realize mode switching, but does not provide the optimum solution for playing. For the method of JP '872, when watching video contents for language learning, it is possible to fast-forward the line-free scenes of the video contents by adjusting time intervals. However, it is necessary to wait depending on played video contents.

In any case, when learners strongly wishing to learn foreign languages learn them by using video contents, they find it difficult or complicated to combine images with spoken voices and subtitles. Also, learners tend to feel tired of learning foreign languages by simply repeatedly playing a chapter or chapters of original video contents. Also, when line-free parts of video contents are continuously played, learners tend to lose concentration or feel bored.

SUMMARY OF THE INVENTION

It is an object of the present invention to provide a playing method more suitable for language learning with video contents so as to provide an efficiently learning environment.

In order to achieve the above object, the present invention provides a method of playing video contents that include language information comprising either or both of spoken voices in at least first and second languages and subtitles in at least the first and second languages, the spoken voices and subtitles being played together with images, the method comprising: dividing the video contents into a plurality of divided scenes including no spoken line-free parts that are free of spoken lines, each of the divided scenes including one or two consecutive displays of subtitles; wherein the method allows a user to select selected scenes of the divided scenes; and playing each of the selected scenes: (i) by a first predetermined number of times selected by the user, in one of the first and second languages that is selected beforehand by the user, together with the images; and (ii) then by a second predetermined number of times selected by the user, in the other of the first and second languages, together with the images.

In most cases, video contents inevitably include line-free parts. Since, when watching video contents for language learning, learners feel that it is a waste of time to watch line-free parts, line-free parts are set not to be played. The remaining line parts of the video contents, which exclude line-free parts, are divided into divided scenes each corresponding to one or two consecutive displays of subtitles such that the divided scenes can be each played in a repeatable manner later. After this dividing step, each of selected scenes of the divided scenes selected by a user is played (i) by a first predetermined number of times selected by the user, in one of first and second languages that is selected beforehand by the user, together with the images; and (ii) then by a second predetermined number of times selected by the user, in the other of the first and second languages, together with the images.

As methods for performing the above, there are (i) a method in which predetermined data structures are first created and stored entirely, and then video contents are played; and (ii) a method in which, while sequentially importing video contents, the data structures are sequentially created before being played. For the former method, after removing spoken line-free parts from the video contents, the remaining line parts of the video contents are divided into divided scenes each corresponding to one or two consecutive displays of subtitles, and the images of each divided scene, and the language information that is played together with the images of each divided scene are stored and imported as a combined data structure. Thereafter, each of selected scenes of the divided scenes selected by a user is played (i) by a first predetermined number of times selected by the user, in one of first and second languages that is selected beforehand by the user, together with the images; and (ii) then by a second predetermined number of times selected by the user, in the other of the first and second languages, together with the images.

By, as described above, dividing the video contents, and creating combined data structures beforehand, it is possible to decrease the arithmetic load when the video contents are played, and thus to use this method even in a terminal having a low performance.

For the latter method, by sequentially importing the data of the video contents without importing spoken line-free parts, the line parts of the subsequentially imported video contents are divided into divided scenes each corresponding to one or two consecutive displays of subtitles, and each of selected scenes of the divided scenes selected by a user is played (i) by a first predetermined number of times selected by the user, in one of first and second languages that is selected beforehand by the user, together with images; and (ii) then by a second predetermined number of times selected by the user, in the other of the first and second languages, together with the images.

If the data of the entire video contents are stored in a storage unit, the storable/available space of the storage unit will be markedly reduced. However, since such sequential processing can be performed only on a memory, even if the capacity of the storage unit is small, the sequentially processing method can be used. Also, the sequentially processing method can be used with respect to video contents of which a copy cannot be stored due to copyright, but requires that the memory as a temporary storage should have a sufficient capacity, because the above removal and division need to be continuously performed before playing.

For the above divided scenes, a single complete sentence may span two consecutive divided scenes, or a single divided scene may include a plurality of sentences if the end of one sentence is vague. The above divided scenes are obtained in an effective manner for learners. One scene or plural scenes to be played are selected from among the divided scenes by a user. Thereafter, the one scene or one of the plural scenes is played with language information in one of first and second languages, and then played with language information in the other of the first and second languages. Thereafter, for the plural scenes, the next scene is played in the same manner.

By appropriately selecting the first and second languages beforehand, the user can learn languages with the optimum language combination based on his own situation. On the other hand, a provider that provides a system or a service may set default languages as the first and second languages, thereby providing a service specializing in the languages.

Also, by preparing and utilizing the material of video scenes excluding line-free parts, it is possible to provide a foreign language learning environment in which learners can learn languages effectively and continuously without losing concentration.

Also, by playing each scene first in a native language corresponding to the first language, and then in a language which corresponds to the second language, and which a learner wishes to learn, the leaner can impressively memorize the phrases of each scene.

According to the present invention, if original video contents include subtitle settings, when spoken voices are played, the corresponding subtitles may be displayed in the same language or in a different language which a learner wishes to learn. In this way, the present invention provides a foreign language learning environment in which a learner can select an effective language combination of sounds and subtitles when playing video contents, and can continuously learn languages.

Also, a learner can learn, relative to his native language corresponding to the first language, a plurality of languages at the same time.

Also, by allotting scene numbers to the respective divided scenes of video contents after removing line-free parts therefrom, a learner can easily recognize the respective scenes, thereby increasing impressive effects.

Options are preferably provided which enable a learner to not only play some scenes of video contents in a predetermined order, but also play each scene of the line parts of video contents first in the first language, and then in the second language such that the whole story of the original video contents is played. By watching the whole story of video contents, a learner may impressively memorize the phrases of each scene through his native language.

Also, when a scene is played, a learner may set, at a predetermined value, the time interval between the scene played in the first language, which usually corresponds to his native language, and the same scene played in the second language, which usually corresponds to a language which the learner wishes to learn. This enables comparative learning, specifically, the learner can pronounce, e.g., a phrase before playing the scene in the second language, and confirm it after actually playing the scene in the second language.

Also, when a scene is played first in the first language, and then repeatedly played in the second language such that one complete play cycle of the scene is played, a learner may play, in the first language (native language), the scene by a predetermined number of times selected by the learner; play, in the second language (language which the learner wishes to learn), the scene by a predetermined number of times selected by the learner; and play one complete play cycle of the scene by a predetermined number of times selected by the learner mainly in accordance with his learning level.

Also, a means may be provided by which a learner can adjust the played speed of a scene played in the first language, and the played speed of the same scene played in the second language. At this time, the images of the scene are played at the above-adjusted played speed.

Also, a means may be provided by which a learner can selectively play and skip a particular scene or scenes per language in accordance with his learning level. Also, a means may be provided by which a learner can selectively change the played order of scenes in accordance with his learning level.

A program for executing the above playing method is preferably stored in a non-transitory storage medium such as an optical disk, an external memory, or a storage device in an application distribution server on a network so as to be installable in a playing device when necessary. The playing device of the present invention stores, in an executable state, the above program in its non-transitory storage unit, and can import and execute the program.

According to the present invention, a learner can play a scene in his native language, and repeatedly play the same scene in a non-native language immediately thereafter, or can play the scene in the reverse order. Also, a learner can play a scene in his native language or a non-native language, and repeatedly play the same scene in a different language immediately thereafter. Therefore, it is possible to firmly memorize an expression of a scene with language information in a plurality of languages. Also, by playing a scene with language information in the first language several times, and repeatedly playing the same scene with language information in the second language, a learner can reliably confirm expressions of the scene with the former language information several times, and then confirm the expressions with the latter language information, thereby easily memorizing the expressions. Also, by performing this after line-free parts are cut, the learner can learn languages while concentrating on such language information without waiting time.

According to the playing method and the playing device of the present invention, a learner can use, as a teaching material, the optimum video contents which he likes, and also can select, as necessary, the optimum scene(s) from the video contents, thereby efficiently learning languages. In other words, the learner can efficiently learn languages by selecting a use scene which he assumes, e.g., conversations in a school, conversations in a business scene, conversations in a dining party or conversations in a travel.

BRIEF DESCRIPTION OF THE DRAWINGS

FIG. 5 is a flow chart showing the steps of a sequentially playing method.

FIG. 6A is a view showing the image data importing step of a different sequentially playing method.

FIG. 6B is a view showing, as the next step, the language data importing step of the different sequentially playing method.

FIG. 6C is a view showing, as the next step, the combining step of the different sequentially playing method.

FIG. 6D is a view showing, as the next step, the playing step of the different sequentially playing method.

FIG. 10 is a view showing a playing condition setting screen displayed on the monitor by the playing device of the present invention.

DETAILED DESCRIPTION OF THE PREFERRED EMBODIMENT(S)

The present invention is described below in detail.

The present invention relates to a playing method and a playing device for playing video contents, and a non-transitory tangible storage medium in which a program for executing the playing method is stored. As used herein, the term "video contents" refer to contents including, in addition to video images, language information comprising either or both of spoken voices and subtitles played together with the video images, such video contents including dramas, animations, news videos and movies. The language information preferably includes at least spoken voices, more preferably both spoken voices and subtitles. The playing method of the present invention is specifically adapted to play video contents including language information consisting of a plurality of languages, in a suitable manner for language learning.

The playing device 11 according to the present invention, which executes the playing method for playing video contents according to the present invention, is a computer including an arithmetic logic unit 12 and a temporary storage unit 13. For example, the playing device 11 may be a general-purpose computer such as a personal computer or a smartphone; a device capable of only playing video contents, such as a DVD player, a Blu-ray (registered trademark) player or a hard disk recorder; or a device intended for a different purpose, but having the functions according to the present invention, such as a car navigation system. The playing device 11 is exemplified as a general-purpose computer in the embodiment, and described below with reference to FIG. 1. The arithmetic logic unit 12 is mainly a CPU (central processing unit), but the playing device 11 may include another arithmetic logic unit.

In any embodiment of the present invention, the playing device 11 of the present invention needs to include one of a storage unit 15 and the temporary storage unit 13, which both temporarily store data from the video contents, and preferably includes the storage unit 15 since the data amount to be stored tends to be large. The temporary storage unit 13 is capable of retaining data by being supplied with power, and may be, e.g., a volatile memory. The storage unit 15 is capable of retaining data without being supplied with power, and may be, e.g., a hard disk or a solid state drive. A program for controlling the playing device 11 is installed in the storage unit 15, but the storage unit 15 may function as a non-transitory storage medium in which such a program is stored in an executable state, too.

Figure 1:
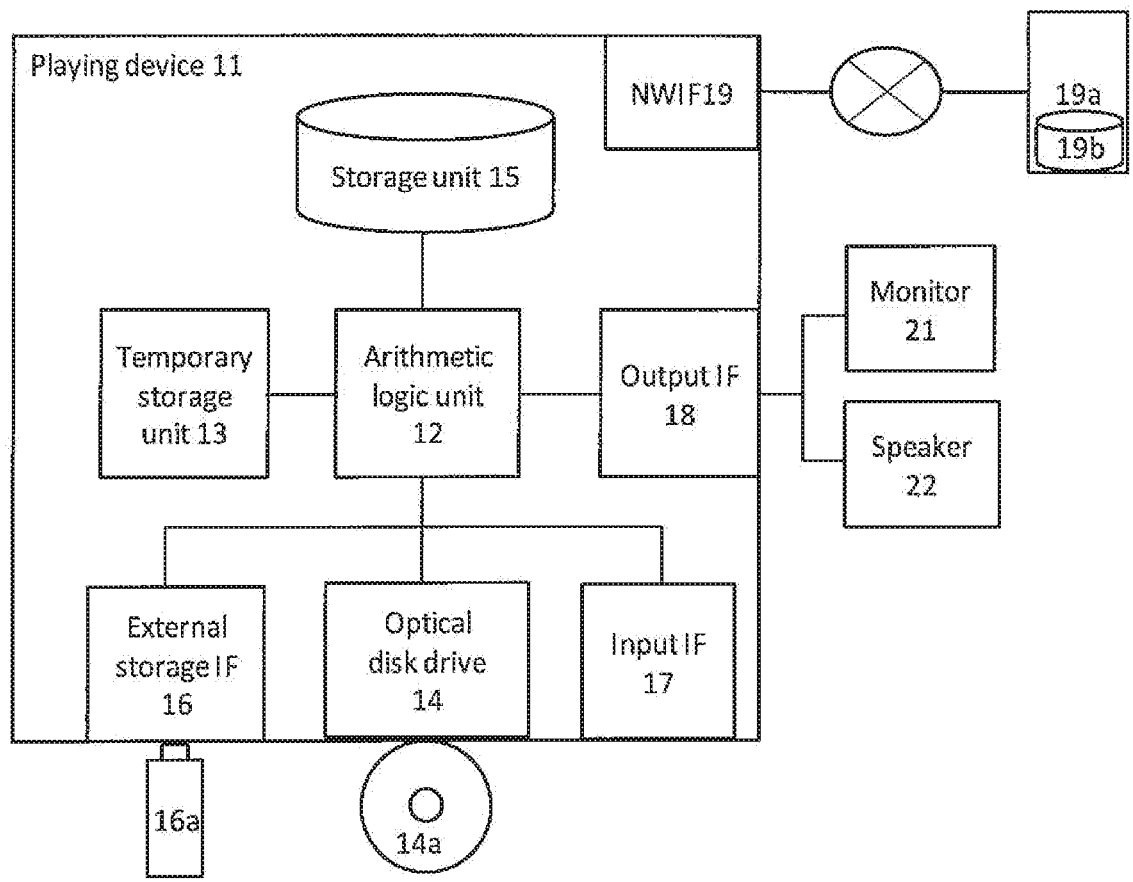
FIG. 1 is a function block diagram of a playing device embodying the present invention.

Since video contents are generally stored in optical disks (one of which is shown in FIG. 1 at 14a) such as DVDs (digital versatile disks) and Blu-ray disks, the playing device 11 of the present invention preferably includes an optical disk drive 14 so that video contents can be imported from such optical disks through the optical disk drive 14. The program for controlling the playing device 11 may be stored in the optical disk 14a, in which case the program stored in the optical disk 14a, which is a non-transitory storage medium, is imported through the optical disk drive 14, and installed into the playing device 11.

The playing device 11 of the present invention may include an external storage interface (abbreviated as "IF" in FIG. 1) 16. The external storage interface 16 may be e.g., a USB (universal serial bus) terminal or a memory card slot. An external memory 16a as a non-transitory storage medium can be connected to the external storage interface 16 to read the program or video contents in the playing device 11. External memories 16a operatively connectable to the USB terminal include, e.g., USB memories, USB connectable hard disks, and USB connectable storage devices. External memories 16a operatively connectable to the memory card slot include, e.g., SD cards (registered trademark), memory sticks (registered trademark), and CompactFlash (registered trademark). Video contents stored in the external memory 16a can be imported into the playing device 11 through the external storage interface 16. Also, the program for controlling the playing device 11 may be stored in the external memory 16a, in which case the program is imported from the external memory 16a through the external storage interface 16, and is installed into the playing device 11.

The playing device 11 of the present invention preferably includes an input interface 17 to enter various operating instructions including selecting video contents to be played, setting the mode for playing the video contents, and playing, and stopping the play of, the video contents. Devices for entering operating instructions through the input interface 17 are not particularly limited provided that a user can operate, with such devices, information displayed on a monitor 21, and may include, e.g., a mouse, a keyboard, an infrared remote controller, and a touch panel.

The playing device 11 of the present invention needs to include an output interface 18 capable of outputting video images and spoken voices, i.e., video image information and language information included in the video contents. Devices connected to the output interface 18 include, e.g., a monitor (such as the monitor 21) and a speaker (such as the speaker 22). In addition to video images, subtitles, a setting screen, etc. are displayed on the monitor 21. The speaker 22 outputs spoken voices together with background sounds. The monitor 21 and the speaker 22 may be integrated with the housing of the playing device 11, or, as shown in FIG. 1, they may be connected to the output interface 18 from outside the housing. Smartphones, tablets, and optical disk players with a monitor are examples in which the monitor and the speaker are integrated with the housing.

The playing device 11 of the present invention may include a network interface 19 (abbreviated as "NWIF" in FIG. 1). The network interface 19 is a device including a wired LAN terminal or a wireless LAN antenna (and software) that allows communication of the playing device 11 with another computer or the internet so that video contents can be obtained from another computer or a server through the network interface 19.

The playing device 11 of the present invention does not need to be a device capable of only playing video contents, and instead, in addition to the function of playing video contents, a program for executing the below-described playing method may be installed in the playing device 11. As non-transitory storage media in which the program to be installed is stored, there are not only the optical disk 14a and the external memory 16a, but also, e.g., a storage device 19b in an application distribution server 19a to which the playing device 11 can be connected through the network interface 19 and a network.

Figure 2A:
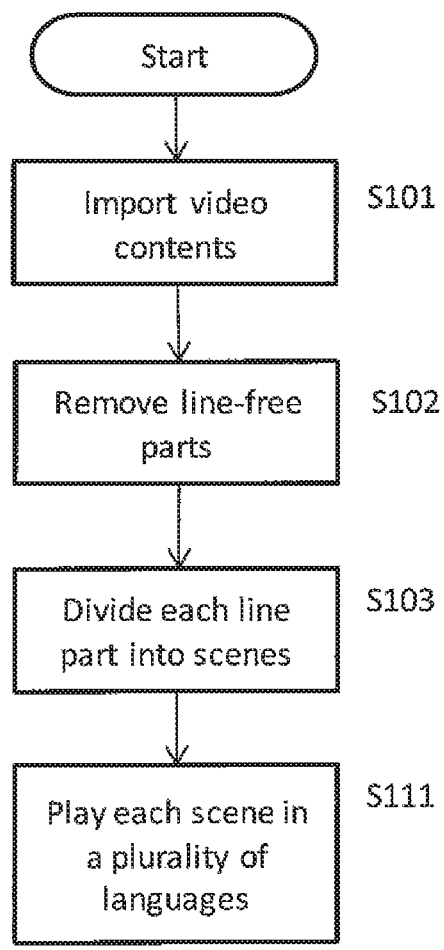
FIGS. 2A and 2B are flow charts each showing the steps of a playing method according to the present invention.

The playing method of the present invention is described below based on some examples. In the playing method of the present invention, the playing device 11 plays video contents by performing, roughly put, the steps shown in FIG. 2A or the steps shown FIG. 2B. In the example of FIG. 2A, the playing device 11 first imports, as data, video contents to be played (S101). The playing device 11 can play video contents while sequentially importing the data thereof in real time. However, except for a quite rare case, the duration of repeatedly played scenes of the video contents does not coincide with the duration of cut scenes thereof. Therefore, it is preferable that the playing device 11 first imports the data of the video contents into its storage unit 15 or temporary storage unit 13, and then performs the following steps beforehand so as to play the video contents based on predetermined settings.

The playing device 11 performs a line-free part removing step (S102) to remove line-free parts from the data of the imported video contents. The reason why S102 is performed is because, in order to efficiently play the video contents especially in a suitable manner for language learning, the duration of the line-free parts should be suitably shortened by removing long line-free and/or background scenes. As used herein, "line-free" parts refer to scenes of the video contents containing no meaningful (spoken) lines and lasting predetermined seconds or more. Line-free parts to be cut or removed are judged based on a predetermined threshold value. That is, line-free parts of which the durations are equal to or exceed the threshold value are cut. While depending on the nature of the video contents, generally speaking, the threshold value is preferably 2 seconds or more, more preferably 3 seconds or more. This is because, if the threshold value is too small, the interval between any two successive normal conversations tends to be too short to be natural. On the other hand, the threshold value is preferably 20 seconds or less, more preferably 15 seconds or less, still more preferably 10 seconds or less. This is because, if the threshold value is too large, waiting time will be too long between lines, which is not suitable for efficiently learning languages.

Figure 3A:
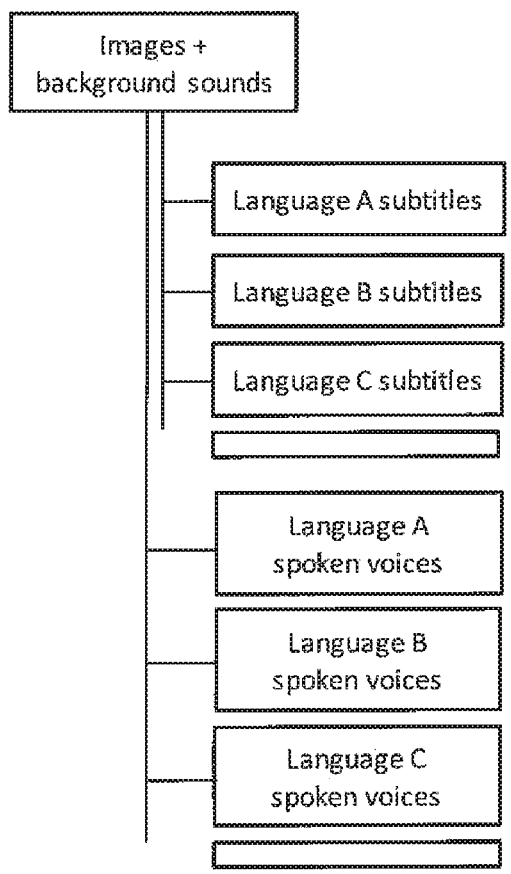
FIG. 3A is a tree diagram showing, as an example, a data structure in each divided scene.
Figure 3B:
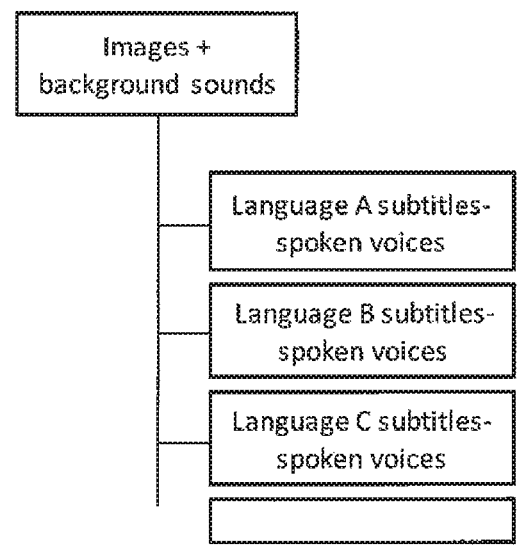
FIG. 3B is a tree diagram showing, as a different example, a data structure in each divided scene.

Next, the playing device 11 performs a scene division step (S103) to divide each of the line parts of the video contents that remain after the line-free part removing step, into a plurality of scenes each corresponding to one display or two consecutive displays of subtitles. While depending on what language is selected, in most cases, one display or two back-to displays of subtitles cover a series of lines recognizable as one sentence. Therefore, for the purpose of language learning, such one display or two consecutive displays of subtitles are preferably repeatedly played as a unit in different languages. It is not necessary that each divided scene includes only one complete sentence. For example, a single complete sentence may span two consecutive divided scenes, provided that repeating a portion of such a single sentence in each divided scene in different languages does not sound unnatural to the user. Also, a single divided scene may include a plurality of sentences. The divided scenes are stored in the storage unit 15 or the temporary storage unit 13 such that the playing device 11 can recognize the respective scenes by, for example, allotting serial numbers to the scenes in chronological order. As a result, as shown conceptually in FIG. 3A or 3B, subtitles and spoken voices in a plurality of languages are linked to each divided scene of the video contents. In the example of FIG. 3A, subtitles in a plurality of languages are stored separately, and spoken voices in the respective languages are also stored separately from each other and from the subtitles. In the example of FIG. 3B, subtitles and spoken voices in each language are stored as a unit. If the video contents include no subtitles, each line part is divided into a plurality of scenes at spoken voice-free parts that last about a few seconds in the selected language because such spoken voice-free parts are considered to be the ends of sentences.

Thereafter, the playing device 11 performs a multi-language repeatedly playing step (S111) to:

(i) first play, a predetermined number of times selected by a user, each divided scene selected by the user based on language information regarding one language selected beforehand by the user, and (ii) then play, by a predetermined number of times selected by the user, the same scene based on language information regarding another language also selected beforehand by the user.

Playing the scene based on language information regarding one language basically means that the scene is played in the one language, i.e., spoken voices are in the one language. Subtitles may be in the one language (i.e., same language as the spoken voices) or in a different language according to user's preference. In other words, the user can select any one of the available languages for subtitles, independently of the language selected for spoken voices. For example, the user may visually confirm the words spoken in English via English subtitles, or visually confirm the meaning of the words spoken in English via Japanese subtitles.

The number of times selected by the user to play the scene based on the language information concerning each language may be one or two or more, and may be equal to or different from the number of times selected by the user for the language information concerning the other language. Also, after the scene is played based on the language information concerning the two languages, the scene may be played once or more based on language information concerning a still different language.

Figure 2B:
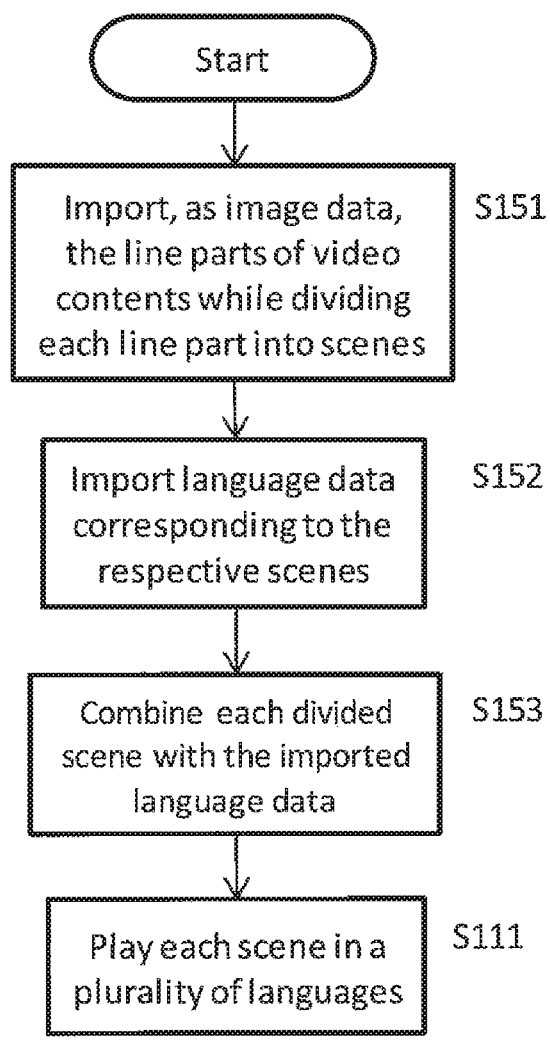

The playing device 11 may play video contents by performing S151 to S153 of FIG. 2B instead of S101 to S103 of FIG. 2A. In the example of FIG. 2B, the playing device 11 first performs a line part image importing step (S151) to scan video contents to be played, and import, as image data, the line parts of the video contents while dividing each line part into a plurality of scenes. The line parts and the line-free parts of the video contents are distinguished from each other in the same manner as in S102. The imported image data are stored in the storage unit 15 or the temporary storage unit 13. Next, the playing device 11 performs a language data importing step (S152) to import language data corresponding to the respective scenes of the imported line parts of the video contents. The imported language data basically include both spoken voices and subtitles. The language data may comprise information on a plurality of languages. Next, the playing device 11 performs a voice and image combining step (S153) to combine each divided scene with the imported language data. In S153, if the language data contain a plurality of languages, the playing device 11 combines each divided scene with language data portions each containing one of the plurality of languages, thereby producing a plurality of combined voice and image data sets. Thereafter, the playing device 11 plays the combined voice and image data sets per scene (S111).

As methods for playing video contents, there are (i) a play-after-storage method in which the above-described data structures are first created and stored entirely, and then the video contents are played; and (ii) a sequentially playing method in which, while sequentially importing video contents, the data structures are sequentially created before being played.

Figure 4:
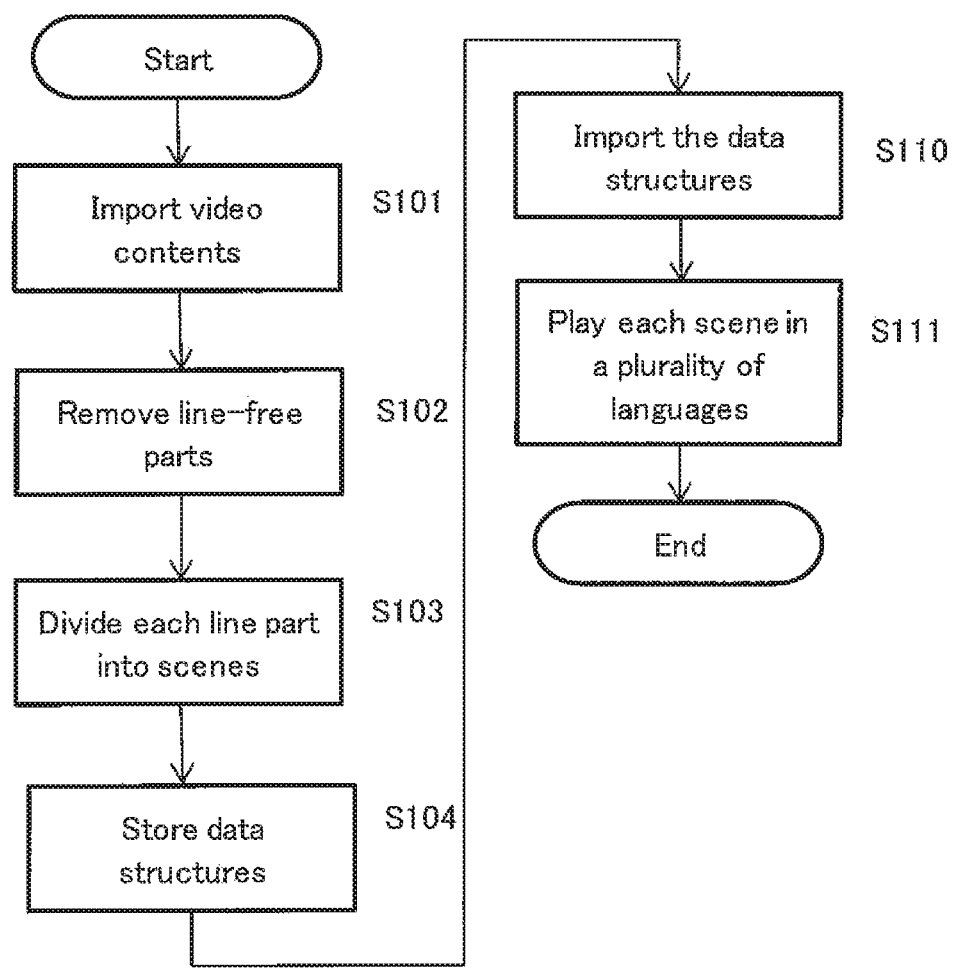
FIG. 4 is a flow chart showing the steps of a play-after-storage method.

Steps of the above play-after-storage method are now described with reference to FIG. 4. After performing S101 to S103 of FIG. 2A or S151 to S153 of FIG. 2B beforehand (S101 to S103 of FIG. 2A are exemplified in FIG. 4), the playing device 11 stores, in its storage unit 15, data structures as shown in FIG. 3A or 3B (S104). If the entire video contents cannot be stored in the temporary storage unit 13 at one time, the playing device 11 imports only a portion of the video contents at one time, and exports it as data structures into the storage unit 15, thereby eventually storing the entire data structures in the storage unit 15. Thereafter, the playing device 11 imports the above data structures from the storage unit 15 when used for language learning (S110), and plays each scene in one or both of the two languages based on automatic or user selection (S111).

Next, exemplary steps of the above sequentially playing method are described with reference to FIG. 5. The horizontal axis of FIG. 5 indicates the elapsed time of processing and playing, and the vertical axis of FIG. 5 indicates the elapsed time of the video contents. First, the playing device 11 grasps the video contents to be played through the optical disk drive 14 in which a medium containing the video contents is now placed. Thereafter, the playing device 11 starts to import, into its temporary storage unit 13, a portion of the video contents having a predetermined time span, before stating to play the video contents (S201). If the playing device 11 imports the entire video contents, the storable/available space of the temporary storage unit 13 will be markedly reduced, and moreover it will take too much time to import the entire video contents, and perform the subsequent steps, so that all the necessary steps will not be completed before stating to play the video contents. The above "predetermined time span" is adjusted based on the arithmetic capacity of the arithmetic logic unit 12, the importing capacity of the optical disk drive 14, etc. The playing device 11 removes line-free parts from the imported portion of the video contents having the above predetermined time span (S202). Thereafter, the playing device 11 divides the data from which line-free parts have been removed, into a plurality of scenes (S203). Once this division is complete, data having structures similar to the above-mentioned data structures are created on the temporary storage unit 13. The playing device 11 plays the thus-created data structures based on designated language information (S211). These steps are parallelly performed for the respective imported portions of the video contents.

Next, further exemplary steps of the above sequentially playing method are described with reference to FIGS. 6A to 6D. First, the playing device 11 grasps the video contents to be played, e.g., through the optical disk drive 14 in which a medium containing the video contents is now placed, or through a network. The playing device 11 then imports the data of the video contents before starting to play the video contents; sequentially extracts the image data of only line parts from the video contents (FIG. 6A); and temporarily stores, into the temporary storage unit 13, the image data as image data sets each composed of one scene or combined two scenes of the extracted video contents. At this time, the playing device 11 allots scene numbers (V00001, V00002, . . . ) to the respective image data sets for management. The allotted scene numbers coincide with the serial numbers of the scenes of the extracted video contents if no scenes are combined, and differ therefrom if any scenes are combined. This step is sequentially performed.

Next, by the playing device 11, line voices and subtitles corresponding to the play times of the respective extracted image data sets are linked to the corresponding allotted scene numbers, and are sequentially temporarily stored into the temporary storage unit 13, with the line voices and subtitles in each language separately from those in other languages. For example, for image data V00001, the playing device 11 allocates serial No. A00001J to Japanese voice data, serial No. A00001E to English voice data, serial No. S00001J to Japanese subtitle data, and serial No. S00001E to English subtitle data (FIG. 6B). The playing device 11 sequentially performs this step while sequentially temporarily storing the image data sets.

Next, the playing device 11 exports, per scene number, line voice and subtitle data from the temporary storage unit 13, and combines these data with the corresponding image data. For example, in order to prepare Japanese data corresponding to scene 00001, the playing device 11 combines together image data V00001, Japanese voice data A00001J, and Japanese subtitle data S00001J (FIG. 6C). In order to prepare English data corresponding to the same scene V00001, the playing device 11 combines together image data V00001, English voice data A00001E, English subtitle data S00001E (FIG. 6C). The playing device 11 sequentially performs this step while sequentially temporarily storing the language data.

Thereafter, the playing device 11 sequentially plays the thus-combined scene data in Japanese and English.

While, in the above example, the playing device 11 combines Japanese voice data with Japanese subtitle data, other combinations are also feasible according to the settings, such combinations including, for example, a combination of Japanese voice data with English subtitle data, a combination of English voice data with Japanese subtitle data, a combination of English or Japanese with another (third) language, a combination of the third language with a fourth language, or a combination of voices and subtitles of the same language. If data containing three or more languages are used, too, the playing device 11 similarly imports these data, and combines them together based on the selected combination.

Figure 7:
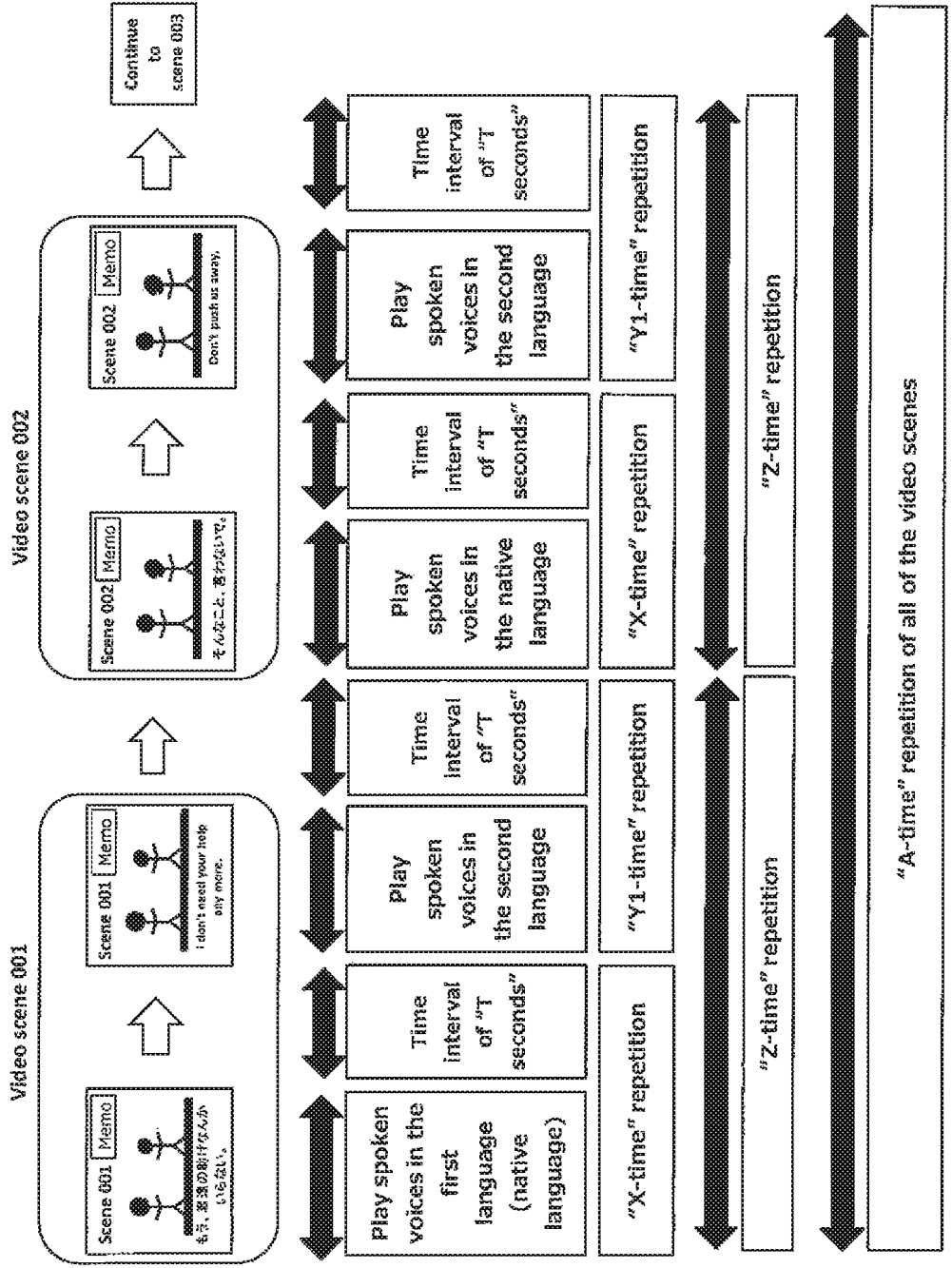
FIG. 7 is a view of a multi-language repeatedly playing step according to a first embodiment.

A specific example of the above multi-language repeatedly playing step is now described with reference to FIG. 7. In this example, Japanese is selected as the first language to be played, and English is selected as the second language to be played. The language of the subtitles is the same as the language of the voices selected. The symbols in the figures, i.e., "X" (times), "Y1" (times), "Z" (times) and "T" (seconds) indicate variables which may be left at default values or may be changed to any arbitrary values.

It is now assumed that the playing device 11 plays divided video scene 001 (including video images) in Japanese as the first language to be played, and this scene includes Japanese voices pronounced as "Mou, kimitachi no tasuke nanka iranai"). The timings of the video images and the voices of scene 001 coincide with those of the images and the voices of the corresponding part of the original video contents. When the Japanese voices and the images of scene 001 are played, Japanese subtitles corresponding to the Japanese voices are also displayed. After video scene 001 is played once in the first language to be played in this manner, the playing device 11 may repeat the same scene in the first language, or may play the same scene in a different language. In either case, a predetermined time interval of T seconds may be inserted between the consecutive repetitions of the scene. If the lines in the second language are started without a moment's interval after the lines in the first language end, it will be difficult for the user to sufficiently quickly switch his mind from the first language mode to the second language mode. Therefore, the T value (seconds) is preferably set at 0.2 or more and 0.4 or less. Variable T is initially set at a default value, but may be altered by the user.

Variable X indicates the number of times the playing device 11 repeatedly (if X is plural) plays video scene 001 with voices in the first language to be played (Japanese in this example) with intervals inserted between the repetitions. If X is 1, however, this means that video scene 001 with Japanese voices is played not repeatedly but only once.

After playing, X times, video scene 001 in the first language, the playing device 11 plays the same video scene 001 but with a phrase "I don't need your help any more.", i.e., a phrase corresponding to the above Japanese phrase but in the second language to be played, namely English. The timings of the video images and the spoken voices of scene 001 coincide with those of the video images and the spoken voices of the corresponding part of the original video contents. When the English voices and the video images of scene 001 are played, English subtitles "I don't need your help any more." are also displayed. The playing device 11 plays, Y times repeatedly (if Y is plural), video scene 001 with voices in the second language to be played, with intervals inserted between the repetitions. If Y1 is 1, however, this means that video scene 001 with English voices are played not repeatedly but only once.

X-time repetition of video scene 001 with Japanese voices, and Y1-time repetition with English voices, with intervals inserted between the repetitions, constitute a complete play cycle of video scene 001, and this cycle is repeated Z times (if Z is plural). If Z is 1, this means that this cycle is not repeated.

After playing, Z times, the above one complete play cycle of video scene 001, the playing device 11 plays, in the same manner as video scene 001, video scene 002 corresponding to the second (in chronological order) part of the original video contents. Specifically, the playing device 11 plays, X times repeatedly, Japanese voices of video scene 002 together with its images, with intervals inserted between the repetitions, and then plays, Y1 times repeatedly, English voices of video scene 002 together with its images, with intervals inserted between the repetitions. These steps constitute a complete play cycle of video scene 002, and this cycle is repeated Z times. Upon completion of this cycle, the playing device 11 plays the next video scene 003.

The playing device 11 plays, only once or A times, all of the video scenes in the above described manner. If the original contents are a feature-length movie or a drama, all of the video scenes are preferably played only once. If the original contents are a short film of a duration of 10 minutes or less, it is sufficiently effective or beneficial to play all of the video scenes twice or more.

Figure 8:
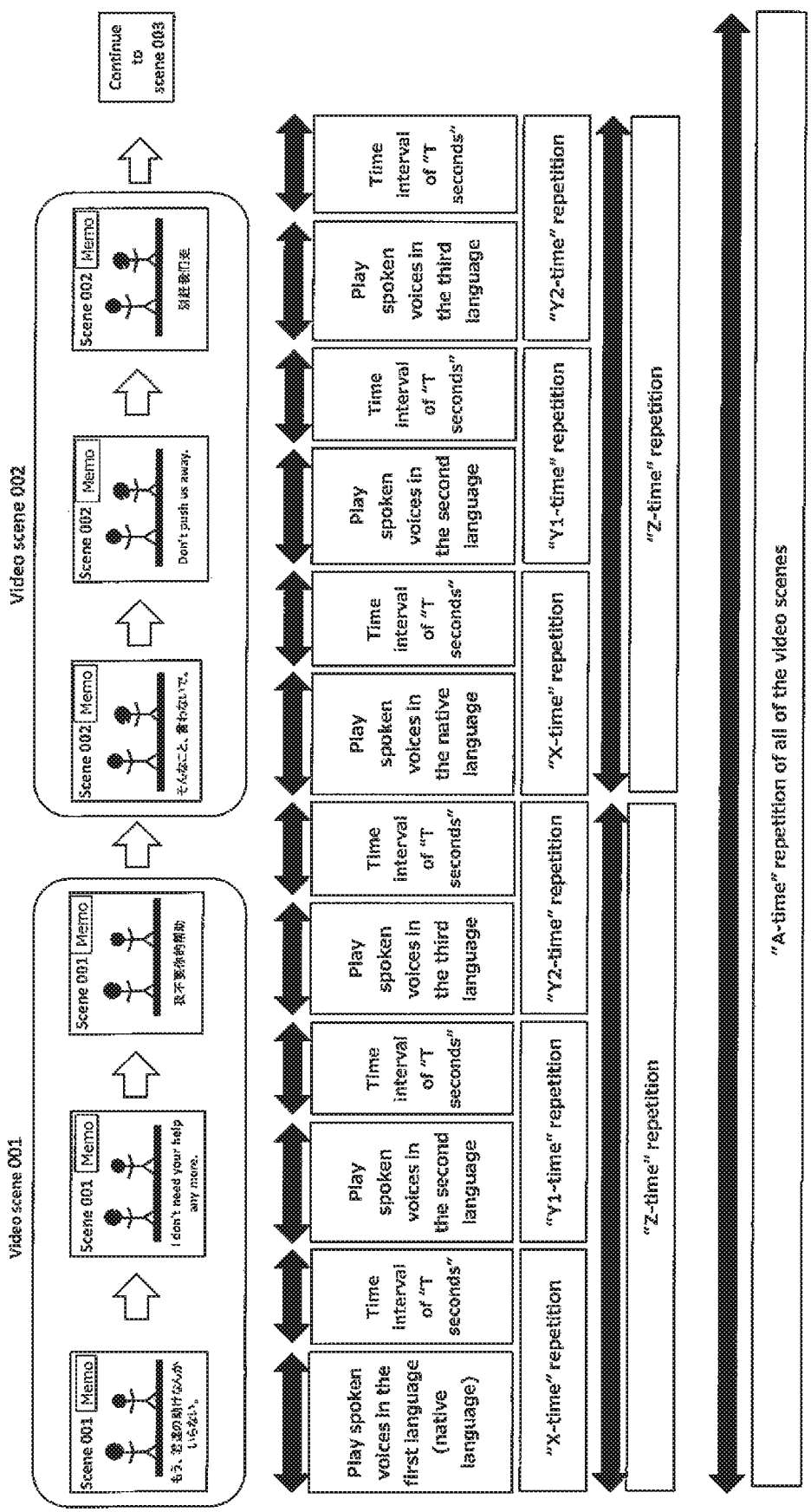
FIG. 8 is a view of a multi-language repeatedly playing step according to a second embodiment.

An example in which voices in three languages are sequentially played is now described with reference to FIG. 8. In this example, the playing device 11 plays, X times, video scene 001 in the first language to be played with intervals inserted between the repetitions. Thereafter, the playing device 11 plays, Y times, video scene 001 in the second language to be played (English in this example), with intervals inserted between the repetitions. The playing device 11 then plays, Y2 times, video scene 001 in the third language to be played (Chinese in this example), with intervals inserted between the repetitions. These steps constitute one complete play cycle of video scene 001, and this cycle is repeated Z times. Upon completion of this cycle, the playing device 11 plays video scene 002 in the same manner as video scene 001. The value of Y2 is variable as with Y1.

Figure 9:
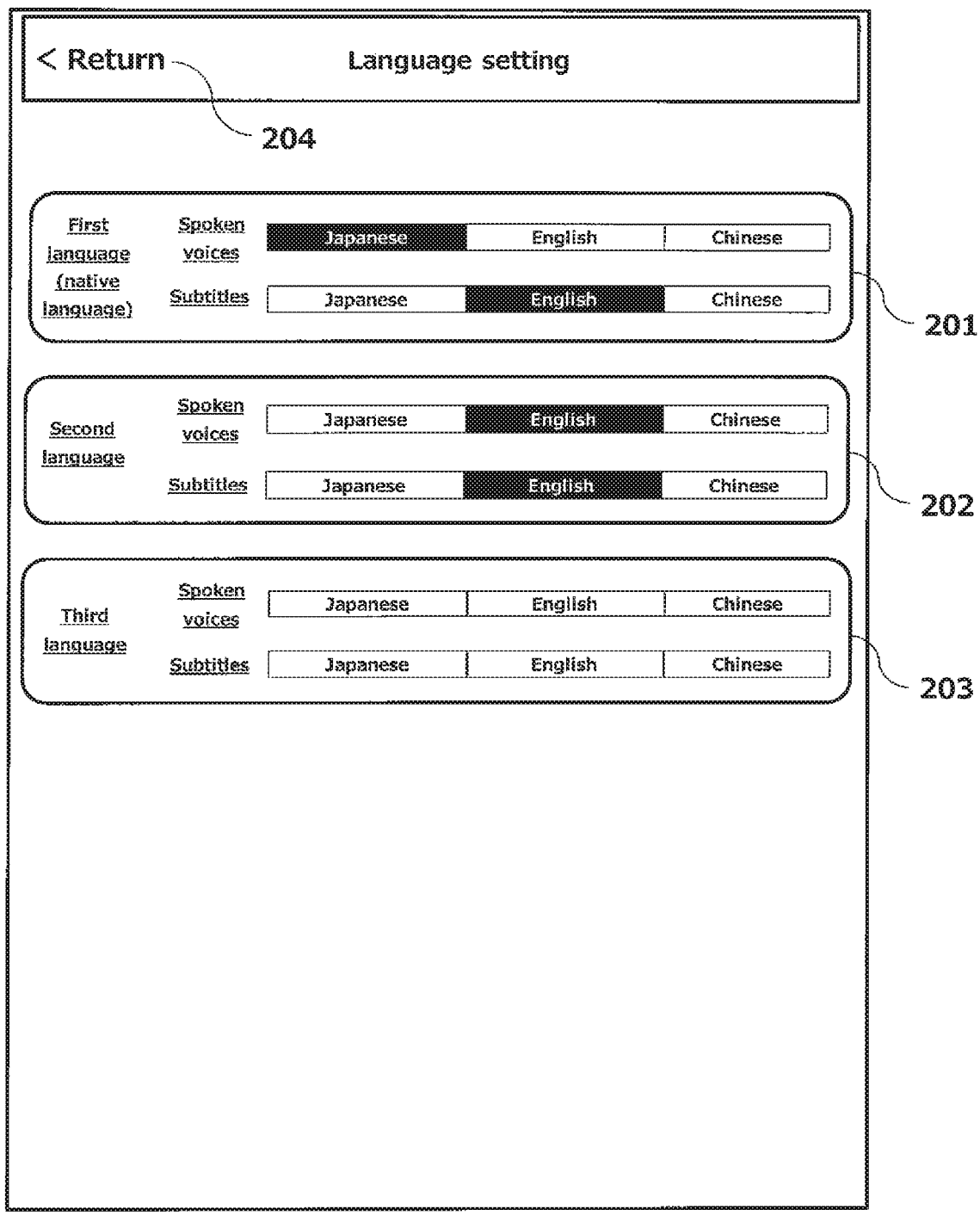
FIG. 9 is a view showing a language setting screen displayed on a monitor by the playing device of the present invention.

In the above examples, Japanese, English and Chinese are used as the first to third languages to be played, respectively, but a different language combination may be used. That is, any combination of languages may be freely selected from among the languages of the language information which the original video contents have. For this purpose, the playing device 11 is preferably programmed to display on the monitor 21 a language setting screen as shown in FIG. 9 that enables the user to easily select, through the input interface 17, voices and subtitles to be played. In particular, the language setting screen has a first language (native language) selection window 201 in which voices and subtitle in the first language to be played (which is the user's native language) can be selected; (ii) a second language selection window 202 in which voices and subtitles in the second language to be played can be selected; and (iii) a third language selection window 203 in which voices and subtitles in the third language to be played can be selected. The language setting screen may include fourth and fifth language selection windows depending on the video contents. However, too many selectable languages will not be suitable for language learning, and the number of languages selectable is preferably limited to three including the user's native language.

The playing device 11 is also preferably programmed to display, on the monitor 21, a playing condition setting screen as shown in FIG. 10 including windows into which the user can enter numerical values of variables X, Y1, Y2, Z, A and T through the input interface 17, thus easily predetermining the above-described number of repetitions and time intervals therebetween based on the numerical values entered.

The playing device 11 may also be programmed such that each scene is played at a different speed in one language from another. For example, speech in the user's native language may be played at an increased speed and thus for a short period of time, because the user should be able to fully understand his or her native language even at high speed. This feature may also be used to play speech in a non-native language at a reduced speed so that the user can more easily understand the foreign-language speech, or at an increased speed to intentionally make the speech harder to understand.

According to the playing method of the present invention, the playing device 11 basically removes line-free parts before playing. However, the playing method may include an option of playing video contents including line-free parts (see FIG. 10).

Figure 11:
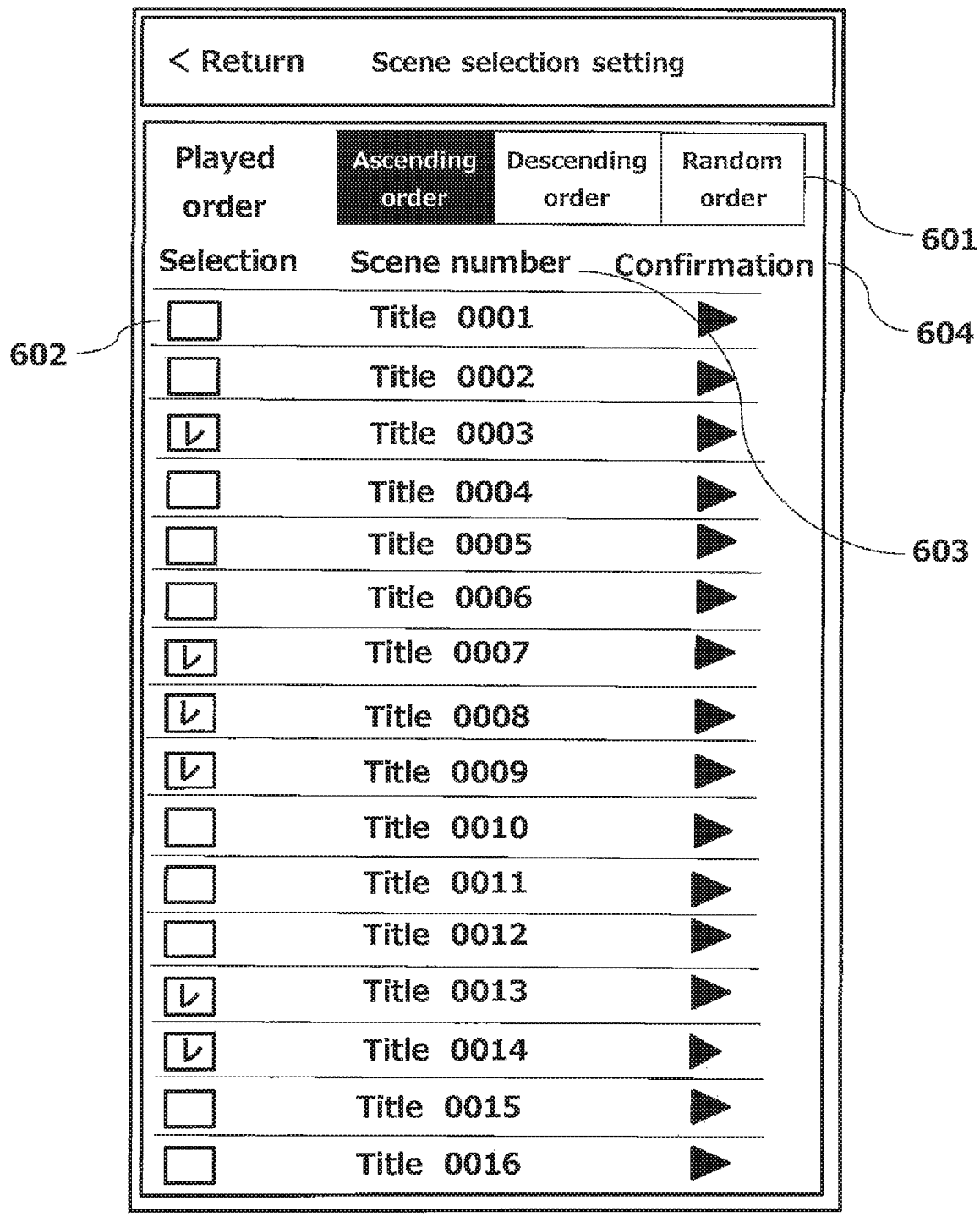
FIG. 11 is a view showing a scene selection setting screen displayed on the monitor by the playing device of the present invention.

While the playing device 11 plays video scene 002 after playing video scene 001 in the above example, the playing device 11 may be programmed to skip a video scene or scenes, and play the next video scene, according to settings. This feature allows the user, For example, to see only scenes in which a particular actor is speaking, while skipping other scenes in which other actors are speaking. In order to realize this, after importing video contents into the storage unit 15 or the temporary storage unit 13, the program for the playing device 11 may display, on the monitor 21, a scene selection setting screen as shown in FIG. 11 which includes check buttons 602 for the respective scenes of the video contents such that only desired scenes are played by selecting the corresponding check buttons 602 through the input interface 17. In FIG. 11, for example, video scene 0007 is played after video scene 0003 while skipping video scenes 0004 to 0006 which are not selected or checked. The scene selection setting screen preferably includes confirmation buttons 604 that correspond to the respective scene numbers 603 such that, when the user touches or selects one of the confirmation buttons 604, the voices and/or subtitles of the corresponding video scene are played, thereby enabling the user to confirm what the video scene is like.

The scene selection setting screen may also include a play order setting window 601 which allows the user to change the order in which the scenes are played from the ascending order (order of the original video contents) to the descending order (reverse order), or to a random order. By providing the play order setting item, the user can learn a foreign language or languages in various manners without depending on the original order. On the other hand, by arranging the scenes in the ascending order, the user can follow the storyline of the original video contents.

Figure 12:
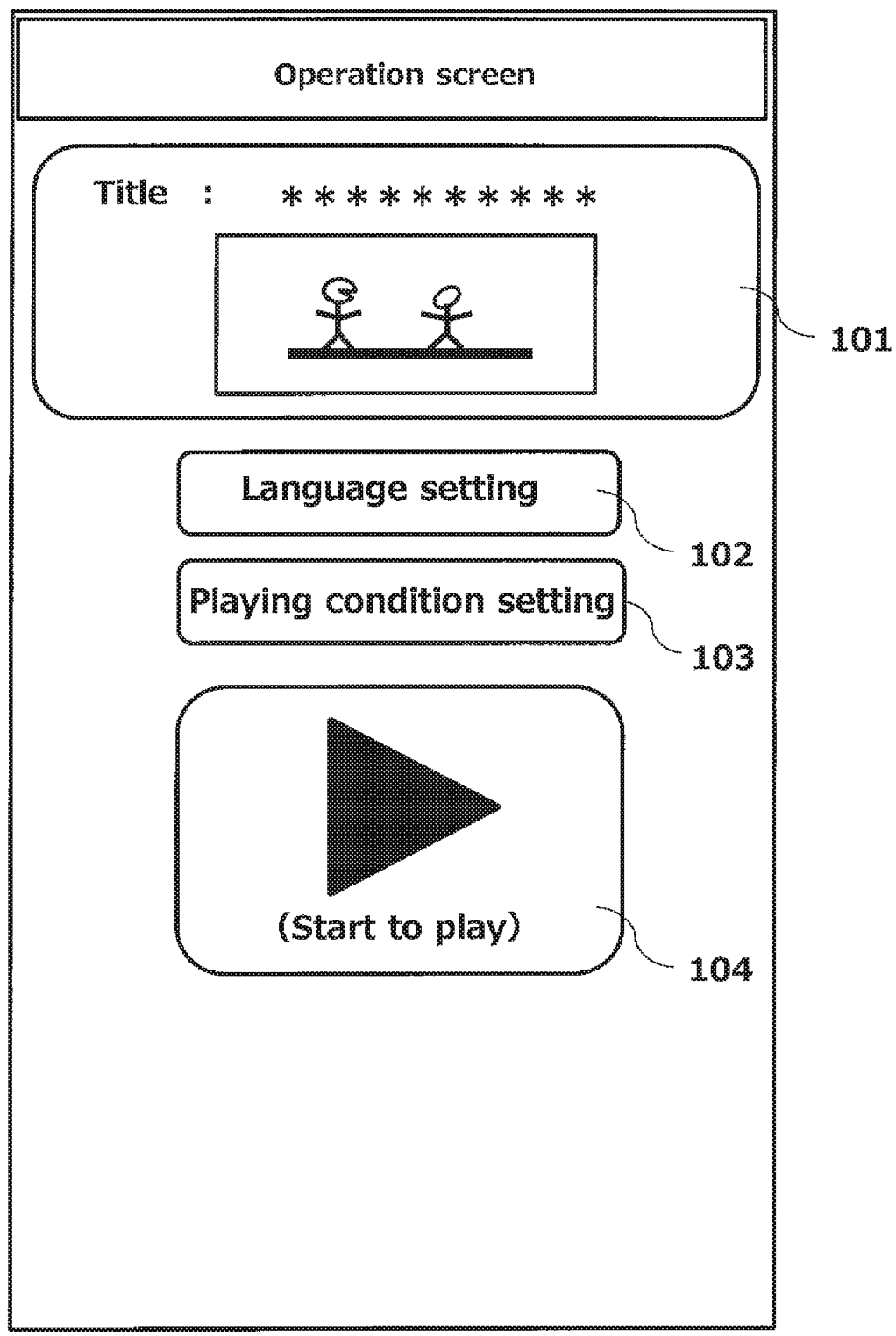
FIG. 12 is a view showing a home screen displayed on the monitor by the playing device of the present invention.

The playing device 11 of the present invention may have a home screen which displays, together with images, buttons selectable to display the above-described respective setting screens. FIG. 12 exemplifies the home screen of a smart phone on which a program is being executed to realize the playing method of the present invention. The shown home screen includes a display area 101 in which images and subtitles are displayed. Other information such as a title or a scene number may be additionally displayed in the display area 101. The shown home screen further includes a language setting button 102 selectable to display the screen of FIG. 9; a playing condition setting button 103 selectable to display the screen of FIG. 10; and a play button 104. After each setting is completed, the shown home screen is displayed again. When the play button 104 is selected, images and subtitles are played within the display area 101. While images are being played, the play button 104 functions as a stop button for stopping the images.

If a server supplies the playing method of the present invention to a user terminal via a network, for an image material other than images whose copyright is owned by the user, and images whose copyright has expired, after obtaining approval by making a contract with the copyright owner, the image material can be utilized, processed, and played as a learning mode.

The invention claimed is:

1. A method of playing video contents that include language information comprising either or both of (a) spoken voices in at least first and second languages, and (b) subtitles in at least the first and second languages, the spoken voices and subtitles being played together with images, the method comprising:
   removing spoken line-free sections from the video contents, the spoken line-free sections including images and no spoken lines;
   after removing the spoken line-free sections, dividing the remaining sections of the video contents into a plurality of divided scenes, each of the divided scenes including one or two consecutive displays of subtitles, the method allowing a user to select a plurality of selected scenes of the divided scenes; and
   playing each of the plurality of selected scenes, the playing of each of the plurality of selected scenes comprising:
      (i) playing each of the plurality of selected scenes a first predetermined number of times in a first one of the first and second languages selected beforehand by the user together with the images, the first predetermined number of times being selected by the user; and
      (ii) then playing each of the plurality of selected scenes a second predetermined number of times in a second one of the first and second languages together with the images, the second predetermined number of times being selected by the user.

2. The method according to claim 1, further comprising:
   removing the spoken line-free parts from the video contents, wherein the divided scenes are obtained by dividing line parts that remain after removing the spoken line-free parts; and
   storing and importing, as a combined data structure, the images of each divided scene, and the language information that is played together with the images of each divided scene, wherein each of the selected scenes is played after importing the data structure corresponding to the selected scene to be played.

3. The method according to claim 2, wherein, in each of the divided scenes, the voices are played in a language different from a language of the subtitles.

4. The method according to claim 1, wherein the divided scenes are created by sequentially importing data of the video contents without importing the spoken line-free parts.

5. The method according to claim 4, wherein, when the language information of the selected scene or scenes is played, a language of the voices thereof is different from a language of the subtitles thereof.

6. The method according to claim 1, wherein, in each of the divided scenes, the voices are played in a language different from a language of the subtitles.

7. The method according to claim 1, wherein the playing of each of the plurality of selected scenes comprises:
   (i) playing a first one of the selected scenes the first predetermined number of times consecutively in the first one of the first and second languages; and
   (ii) then playing the first one of the selected scenes the second predetermined number of times consecutively in the second one of the first and second languages together with the images, the second predetermined number of times being selected by the user; and
   (iii) repeating steps (i) and (ii) for each of the remaining selected scenes.

8. A video contents playing device configured to:
   import video contents that include language information comprising either or both of spoken voices in at least first and second languages, and subtitles in at least the first and second languages such that the spoken voices and subtitles are played together with images; and
   execute the method according to claim 1.

9. A video contents playing device configured to:
   import video contents that include language information comprising either or both of spoken voices in at least first and second languages, and subtitles in at least the first and second languages such that the spoken voices and subtitles are played together with images; and
   execute the method according to claim 2.

10. A video contents playing device configured to:
    import video contents that include language information comprising either or both of spoken voices in at least first and second languages, and subtitles in at least the first and second languages such that the spoken voices and subtitles are played together with images; and
    execute the method according to claim 4.

11. A video contents playing device configured to:
    import video contents that include language information comprising either or both of spoken voices in at least first and second languages, and subtitles in at least the first and second languages such that the spoken voices and subtitles are played together with images; and
    execute the method according to claim 6.

12. A video contents playing device configured to:
    import video contents that include language information comprising either or both of spoken voices in at least first and second languages, and subtitles in at least the first and second languages such that the spoken voices and subtitles are played together with images; and
    execute the method according to claim 3.

13. A video contents playing device configured to:
    import video contents that include language information comprising either or both of spoken voices in at least first and second languages, and subtitles in at least the first and second languages such that the spoken voices and subtitles are played together with images; and
    execute the method according to claim 5.

14. A non-transitory storage medium that stores a program configured to control a computer so as to:
    remove spoken line-free sections of video contents from the video contents, the spoken line-free sections including images and no spoken lines, the video contents including language information comprising either or both of (a) voices in at least first and second languages and (b) subtitles in at least first and second languages such that the spoken voices and the subtitles are played together with images,
    after removing the spoken line-free sections, cut the remaining sections of the video contents into a plurality of cut scenes each corresponding to one display or two consecutive displays of subtitles, and store the plurality of cut scenes as data structures, wherein the program allows a user to select a plurality of selected scenes of the plurality of cut scenes;
    import the data structures; and
    play each of the plurality of selected scenes, the playing of each of the plurality of selected scenes comprising:
    (i) playing each of the plurality of selected scenes a first predetermined number of times in a first one of the first and second languages selected beforehand by the user; together with the images, the first predetermined number of times being selected by the user; and
    (ii) then playing each of the plurality of selected scenes a second predetermined number of times in a second one of the first and second languages; together with the images, the second predetermined number of times being selected by the user.

15. The non-transitory storage medium according to claim 14, wherein the playing of each of the plurality of selected scenes comprises:
    (i) playing a first one of the selected scenes the first predetermined number of times consecutively in the first one of the first and second languages; and
    (ii) then playing the first one of the selected scenes the second predetermined number of times consecutively in the second one of the first and second languages together with the images, the second predetermined number of times being selected by the user; and
    (iii) repeating steps (i) and (ii) for each of the remaining selected scenes.

16. A non-transitory storage medium that stores a program configured to control a computer so as to:
    sequentially import data of video contents including language information comprising either or both of (a) voices in at least first and second languages, and (b) subtitles in at least the first and second languages such that the voices and the subtitles are played together with images, while not importing any spoken line-free sections that include images and no spoken lines;
    cut, while importing the video contents, imported portions of the video contents into a plurality of scenes each corresponding to one display or two consecutive displays of subtitles, wherein the program allows a user to select a plurality of selected scenes of the cut scenes; and
    play, while importing the video contents, each of the plurality of selected scenes, the playing of each of the plurality of selected scenes comprising:
    (i) playing each of the plurality of selected scenes a first predetermined number of times in a first one of the first and second languages selected beforehand by the user; together with the images, the first predetermined number of times being selected by the user; and (ii) then playing each of the plurality of selected scenes a second predetermined number of times in a second one of the first and second languages together with the images, the second predetermined number of times being selected by the user.

17. The non-transitory storage medium according to claim 16, wherein the playing of each of the plurality of selected scenes comprises:

(i) playing a first one of the selected scenes the first predetermined number of times consecutively in the first one of the first and second languages; and (ii) then playing the first one of the selected scenes the second predetermined number of times consecutively in the second one of the first and second languages together with the images, the second predetermined number of times being selected by the user; and (iii) repeating steps (i) and (ii) for each of the remaining selected scenes.

\* \* \* \* \*